United States Patent [19]

Blöcker et al.

[11] 3,887,521

[45] June 3, 1975

[54] LIGHT-STABILIZED SYNTHETIC LINEAR POLYESTERS AND SHAPED STRUCTURES MADE THEREFROM

[75] Inventors: Erich Blöcker, Weilbach; Walter Rupp, Schneidhain, Taunus; Franz Jakob, Hofheim, Taunus, all of Germany

[73] Assignee: Hoechst Aktiengesellschaft, Frankfurt, (Main) Germany

[22] Filed: May 10, 1974

[21] Appl. No.: 469,032

[30] Foreign Application Priority Data

May 14, 1973 Germany.............................. 2324349

[52] U.S. Cl.. 260/47 C; 260/45.85 P; 260/45.95 H; 264/210 F
[51] Int. Cl............................................. C08g 17/14
[58] Field of Search ..... 260/47 C, 45.95 H, 45.85 P

[56] References Cited
UNITED STATES PATENTS

| | | | |
|---|---|---|---|
| 3,344,115 | 9/1967 | Rein...................................... | 260/47 |
| 3,381,058 | 4/1968 | Caldwell et al..................... | 260/860 |
| 3,386,952 | 6/1968 | Gleim et al........................ | 260/45.85 |
| 3,549,593 | 12/1970 | Takekushi............................. | 260/47 |
| 3,560,439 | 2/1971 | Price et al............................. | 260/47 |
| 3,635,899 | 1/1972 | Doerr et al......................... | 260/75 M |
| 3,652,502 | 3/1972 | Jackson, Jr. et al. ............. | 260/75 R |
| 3,752,867 | 8/1973 | Merck et al. ........................ | 260/869 |
| 3,776,887 | 12/1973 | Juelke et al...................... | 260/47 C |

Primary Examiner—Lester L. Lee
Attorney, Agent, or Firm—Curtis, Morris & Safford

[57] ABSTRACT

Light-stabilized synthetic linear, fiber- and film-forming polyesters are obtained by incorporating into the macromolecules composed of dicarboxylic acid and diol moieties about 0.1 to 5 mole percent of structural units of the formula

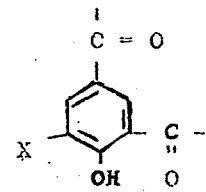

in which X stands for the group

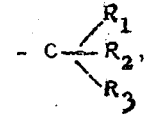

wherein $R_1$, $R_2$ and $R_3$ each are hydrogen or an alkyl radical having from 1 to 4 carbon atoms.

8 Claims, No Drawings

LIGHT-STABILIZED SYNTHETIC LINEAR POLYESTERS AND SHAPED STRUCTURES MADE THEREFROM

The present invention relates to light-stabilized synthetic linear polyesters and shaped structures made therefrom, for example fibers, filaments, sheets and other shaped articles. The essential characteristic of the said polyesters is a low content of 5-alkyl-substituted 4-hydroxy-isophthalic acid units in the chain of the macromolecules, which units are responsible for the improved stability to light of the polyesters.

It is known that natural and synthetic polymers which do not contain a stabilizing compound are damaged or decomposed under the action of light, whereby the molecular weight is reduced and the strength, for example of fibers and filaments, is diminished. In many cases the damage by the action of light is accompanied by a certain coloration and/or embrittlement of the polymer material. Although the synthetic linear polyesters, which are used on a large scale for making fibers, filaments, sheets and shaped articles, generally have a good light stability, it may be desirable or necessary, especially in some technical fields of application, to improve their stability to the action of light, i.e., the visible as well as ultraviolet light.

The improvements hitherto achieved by incorporating absorbents into fibers, filaments, sheets and shaped articles or by coating same with such substances have not been fully satisfactory, especially as regards the poor abrasion resistance and fastness to washing of the absorbents. Attempts have beem made to overcome these deficiencies by incorporating suitable light stabilizers or UV absorbents into the molecule chains of various polymers. To stabilize synthetic linear polyesters against the action of light bifunctional ester-forming monomers are necessary which generally absorb light in the near UV range, i.e. of from about 290 to 400 nm and transform the absorbed light energy into a harmless form of energy, especially heat energy. They should no longer absorb above a value of about 400 nm in order that they are colorless or at most slightly yellow and do not color the polyester which should nowadays have a very high degree of whiteness, above all in textile industries. Moreover, the absorbents should be thermostable, i.e. they should not decompose under the condensation conditions of the polyester manufacture.

In U.S. Pat. No. 3,308,095 it has been proposed to incorporate into polyesters bifunctional derivatives of compounds known as light stabilizers, especially derivatives of 2-hydroxybenzophenone, of 2-(o-hydroxyphenyl)-benzo- and -naphthotriazole. Although in the said patent it is stated that the hydroxyl groups in ortho position in the said light stabilizers are relatively inactive to an esterification, i.e. less active than hydroxyl groups in para-position, an at least partial esterification of said hydroxyl groups in ortho-position cannot be excluded.

Several attempts to incorporate 2-hydroxy-3,5-dicarboxybenzophenone into polyethylene terephthalate revealed that a distinct cross linking reaction took place and, therefore, the modified polyester was hardly suitable for making filaments and fibers having valuable textile properties. Moreover, polyesters into which derivatives of o-hydroxybenzophenone or benzo- or naphthotriazole had been incorporated by condensation were mostly colored.

Japanese Specification No. 71/21,747 describes the cocondensation of 2-hydroxyisophthalic acid or the alkyl esters thereof into polyesters and polyester esthers in order to produce fluorescing products. These products are characterized, inter alia, by an improved stability to light. Although the phenolic hydroxyl group of 2-hydroxyisophthalic acid or the esters thereof is little reactive owing to the steric hindrance by two carboxyl or carbalkoxyl groups in ortho-position, it is not absolutely inactive in the mixture used for making the polyester. In this case too, cross-linking takes place to a considerable extent, which detrimentally affects the properties of the resulting polyester when it is used for making filaments and fibers.

In U.S. Pat. No. 3,560,439 a substituted 2-hydroxyisophthalic acid, namely 2-hydroxy-5-methoxyisophthalic acid, is used as cocondensation component for polyesters to achieve optical brightening and thermostabilization. The modified polyesters are characterized as resinous copolyesters in which a low degree of cross linking does not exhibit a detrimental effect.

The use of derivatives of 4-hydroxyisophthalic acid, namely 4-hydroxyisophthalic acid alkylphenyl esters as UV-light stabilizers, especially for polyolefins is described in German Pat. No. 1,962,229. The stabilizing compounds are only mixed with the polyolefins since an incorporation into the polymer molecule is not possible for the lack of olefinically unsaturated groups. When such 4-hydroxyisophthalic acid alkylphenyl esters are incorporated by condensation into polyesters, which is not described in the said patent, for example into polyethylene terephthalate, the phenolic hydroxyl group is not inactive in the esterification and brings about a considerably cross-linking reaction.

Finally, various hydroxybenzene-dicarboxylic acid esters have been proposed in British Specification 1,000,193 as cross linking agents to manufacture polyesters with reduced tendency to pilling and improved dyestuff affinity.

It is the object of the present invention to find light stabilizers on the basis of hydroxyisophthalic acids which bring about, if possible, a better and by no means a noticeably poorer light stabilization than the known compounds and which can be incorporated into the molecule chains of linear polyesters without a noticeable cross linking reaction taking place. It has now been found that 5-alkyl-substituted 4-hydroxyisophthalic acids and the esters thereof fully comply with the aforesaid requirements.

The present invention therefore provides synthetic linear fiber- and film-forming polyesters the macromolecules of which are composed of dicarboxylic acid and diol moieties, wherein about 0.5 to 5 mole percent, preferably about 0.5 to 3 mole percent of the dicarboxylic acid units are structural units of the formula

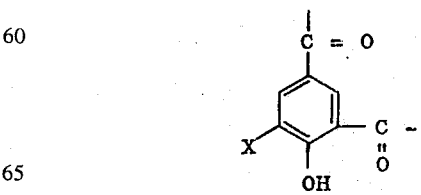

in which X represents the radical

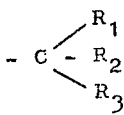

wherein $R_1$, $R_2$ and $R_3$ are hydrogen or alkyl radicals having from 1 to 4 carbon atoms, preferably $R_1$ represents hydrogen and $R_2$ and $R_3$ each represent alkyl radicals having from 1 to 4 carbon atoms.

The major portion of the dicarboxylic acid moieties of the polyesters, i.e. at least 90 mole percent, preferably consists of terephthalic acid moieties and the major portion of the diol moieties, i.e. likewise at least 90 mole percent, preferably consists of ethylene glycol or n-butylene glycol moieties.

The polyesters of the invention, which are characterized by an excellent light stability and are practically free from cross linkings, are produced by esterificatiton and ester interchaange reaction of the dicarboxylic acid and diol starting components generally used for making fiber- and film-forming polyesters, with subsequent polycondensation. During the esterification or ester interchange or during the polycondensation about 0.1 to 5 mole percent, preferably 0.5 to 3 mole percent, calculated on the total amount of dicarboxylic acid component, of a compound of the formula

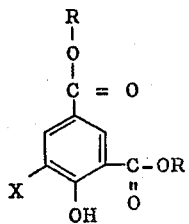

in which X has the meaning defined above and R represents hydrogen, an alkyl radical preferably having from 1 to 6 carbon atoms or an aryl radical is added. The usual dicarboxylic acid and diol starting components, i.e., terephthalic acid or the esters thereof with low molecular weight aliphatic alcohols having from 1 to 6 carbon atoms, and ethylene glycol or butylene glycol may be used in admixture with about 5 to 9.9 mole percent of other aromatic or aliphatic dicarboxylic acids or the esters thereof with the specified alcohols and up to about 10 mole percent of other diols.

The invention further relates to fibers, filaments, sheets and shaped articles made by injection molding, extrusion or compression from the linear polyesters of the invention containing structural units of 5-alkyl-substituted 4-hydroxyisophthalic acid.

In the 5-alkyl-substituted 4-hydroxyisophthalic acid the phenolic hydroxyl group is sterically hindered by the two substituents in ortho-position, i.e. the adjacent carboxyl group on the one hand and the alkyl substituent on the other, and therefore its reactivity is strongly impaired so that under normal polyester forming conditions a cross linking be esterification of the phenolic OH group does not or practically not take place.

The OH group is protected to a sufficient extent by the adjacent substituent X representing straight chain or branched alkyl radicals. It is known that tertiary alkyl radicals have a very great spatial hindering effect on adjacent groups owing to their voluminosity and, therefore, the phenolic OH group in 5-tert.butyl-4-hydroxyisophthalic acid is particularly slow to react. This can be perceived, for example, by the fact that a polyethylene terephthalate containing said compound incorporated by condensation can be processed to yield spun filaments having maximum draw properties and excellent textile values, which is not the case, at least to this extent, with a cross-linked polyester. As regards the light stabilizing effect 5-tert.butyl-4-hydroxyisophthalic acid does not fully reach, however, the quality of the other derivatives falling within the scope of the above formula. Preferred compounds are those carrying in 5-position a secondary alkyl radical, i.e. compounds in which in the above formula $R_1$ represents hydrogen and $R_2$ and $R_3$ represent alkyl radicals.

From among the compounds of this type there are particularly preferred 5-isopropyl- and 5-sec-butyl-4-hydroxyisophthalic acid. The 5-substituted 4-hydroxyisophthalic acid derivatives to be used according to the invention are prepared by known methods, for example by a Kolbe-Schmitt synthesis from the sodium or patassium salts of the respective o-alkyl-phenols, as described in Beilstein, volume 10, page 513 for 5-methyl-4-hydroxyisophthalic aicd. 5-Isopropyl-4-hydroxyisophthalic acid (melting point 299°–300°C with decomposition) can be prepared from o-isopropylphenol sodium by carboxylation of a suspension in xylene in an autoclave with $CO_2$ at 220° to 240°C under a pressure of 35 atmospheres gauge. 5-tert.butyl-4-hydroxyisophthalic acid prepared in analogous manner has a melting point of 307°C with decomposition and the melting point (with decomposition) of 5-sec.butyl-4-hydroxyisophthalic acid is 282°C.

Other mono- or polynuclear aromatic compounds carrying the substituents —COOH, —OH and alkyl in that order one beside the other at the benzene nucleus have also a light stabilizing effect on polyesters. Compounds of this type are, for example, 3-alkyl-substituted 2-hydroxyterephthalic acids and 4-alkyl-substituted 3-hydroxyphthalic acids which can be incorporated into the polyesters in the same manner as the aforesaid isophthalic acid derivatives and contain the grouping important to the light stabilization with simultaneous steric hindrance of the hydroxyl group. But these compounds are much more difficult to prepare than the corresponding isophthalic acid derivatives. The same applies to the polynuclear aromatic compounds, for example diphenyl-, diphenylmethane or diphenyl ether derivatives carrying the three essential substituents in ortho-position. Provided that they do color the respective polyester, these compounds likewise act as light stabilizers.

The light stabilized synthetic linear polyesters of the invention may contain as dicarboxylic acid components, besides the structural units of the 5-substituted 4-hydroxyisophthalic acid, units of dicarboxylic acids as generally present in fiber- and film-forming polyesters, such as for example of isophthalic acid, diphenyl-4,4'-dicarboxylic acid, diphenylmethane-4,4'-dicarboxylic acid, diphenyl ether 4,4'-dicarboxylic acid, diphenylsulfone-4,4'-dicarboxylic acid, 1,2-bis(p-carboxyphenyl)-ethane, 1,2-bis-(p-carboxypehnoxy)-ethane, benzophenone-4,4'dicarboxylic acid, naphthalene-dicarboxylic acids, aliphatic dicarboxylic acids, for example adipic acid or sebacic acid. The acids may carry substituents which do not disturb the polycondensation, for example alkyl radicals, fluorine, chlorine or bromine atoms, or sulfo groups. The preferred dicarboxylic acid is terephthalic acid. The polyesters may contain any one or mixtures of the aforesaid dicarboxylic acids.

Suitable diol components in the polyesters of the invention are those known for making fiber- and film-forming polyesters, preferably glycols of the formula $HO(CH_2)_nOH$ in which n is an integer in the range of from 2 to 10, diethylene glycol, neopentyl glycol, 1,4-bis(hydroxymethyl)cyclohexane, 1,4-bis(hydroxyethyl)benzene, 1,4-bis(hydroxyethoxy)benzene. Preferred diols are ethylene glycol and butylene glycol.

The synthetic linear polyesters of the invention are prepared by known methods either from the free dicarboxylic acids or the dicarboxylic acid esters with low aliphatic alcohols, especially the dimethyl esters, and the corresponding diols. The starting compounds are esterified or subjected to an ester interchange reaction according to a usual process and then polycondensed in known manner in the presence of known catalysts and additives. The 5-substituted 4-hydroxyisophthalic acid, the lower alkyl ester (having 1 to 6 carbon atoms in the alkyl group) or the aryl ester is added during the esterification or ester interchange reaction or during polycondensation. When the stabilizer according to the invention is added in the form of its diphenyl ester, this should be done during the course of the polycondensation since in this manner a special effect can be obtained, i.e. the polycondensation is accelerated considerably and higher polymer viscosities are obtained. This accelerating effect of aromatic dicarboxylic acid diphenyl esters is known from U.S. Pat. No. 3,433,770.

When the light stabilizing compound is added in a relatively late reaction stage, that is to say towards the middle or the end of the polycondensation, the minor probability of an esterification of the sterically hindered OH group is further reduced.

The light stabilized synthetic linear polyesters of the invention, the specific viscosity $\eta$ spec of which (cf. item 8 of following Table) should be at least about 0.5, preferably at least about 0.7, can be transformed in usual manner to yield filaments, fibers, sheets and shaped articles of any kind. Yarns made from the polyester fibers and filaments are especially suitable in technical fields of application for example for surface supporting structures, such as ceilings for open air constructions. The light stablized polyesters of the invention can also be used for making other articles subject to permanent weathering, for example fishing nets, ropes, snow fences, or silos.

The following table compares the properties of filament yarns of unmodified polyethylene terephthalate, filaments yarns modified by known stabilizers and filament yarns modified according to the invention. It can be clearly seen that the filament yarns according to the invention have a better stability to light. Although the polyethylene terephthalate filament yarns modified with 5-tert.butyl-4-hydroxyisophthalic acid have a slightly lower tensile strength after the exposure to light than the filament yarns modified with 2-hydroxyisophthalic acid, their elongation at break is distinctly better and moreover, the polyester modified according to the invention is practically not cross linked (which, as a fact, is not shown in the table).

TABLE

| | filament yarns from | | | | | | |
|---|---|---|---|---|---|---|---|
| | unmodified polyethylene glycol terephthalate (standard material) | PET with chain units (Jap. spec. 71/21747) | | | | PET with chain units | |
| stabilizer concen. wt. % (6) | - | - | 0.5 | 1.0 | 1.5 | 0.464 | 0.928 |
| mole % (7) | | | 0.46 | 0.92 | 1.38 | 0.49 | 0.98 |
| TiO$_2$-content wt. % | - | 0.04 | - | - | - | 0.04 | 0.04 |
| viscosity of spun filaments $\eta$ spec (8) | 0.68 | 0.63 | 0.74 | 0.77 | 0.73 | 0.60 | 0.78 |
| tensile strength (g/dtex) | 4.4 | 4.5 | 4.2 | 3.1 | 2.7 | 2.9 | 3.0 |
| elongation at break % (of drawn filaments) | 22.2 | 26.1 | 19.0 | 33.9 | 27.6 | 25.6 | 27.5 |
| residual tensile strength after 760 hrs xeno test (%) (9) | 72.0 | 75.5 | 81.0 | 85.5 | 87.0 | 74.5 | 82.6 |
| 500 hours sunlight under window glass (10) | 91.5 | 89.5 | 94.0 | 95.5 | 96.0 | 94.0 | 91.5 |
| 500 hours sunlight (weathering) (10) | 65.0 | 69.0 | 77.0 | 80.0 | 82.0 | 73.5 | 77.5 |
| residual elongation at break % after 750 hours xeno test (9) | 49.0 | 48.5 | 54.0 | 48.5 | 41.0 | 54.5 | 51.5 |
| 500 hours sunlight under window glass (10) | 68.0 | 48.0 | 66.5 | 60.0 | 52.0 | 79.0 | 74.0 |
| 500 hours sunlight (weathering) (10) | 51.5 | 35.0 | 49.0 | 39.0 | 35.0 | 51.5 | 57.5 |

Table (cont.)

| | filament yarns according to invention PET with chain units $X-\underset{OH}{\bigcirc}\overset{C-O}{\underset{}{C-}}$ | | | | | | | |
|---|---|---|---|---|---|---|---|---|
| | X - CH$_3$ | | | X - CH(CH$_3$)$_2$ | | | X-C(CH$_3$)$_3$ | X=CH$\overset{C_2H_5}{\underset{CH_3}{}}$ |
| stabilizer concen. wt. % (6) | 0.5 (1) | 1.0 | 3.0 (2) | 0.5 | 1.0 (3) | 1.5 | 1.0 (4) | 1.0 (5) |
| mole % (7) | 0.49 | 0.98 | 2.94 | 0.43 | 0.86 | 1.29 | 0.81 | 0.81 |
| TiO$_2$-content wt. % | - | - | 0.04 | - | - | - | 0.04 | - |
| viscosity of spun filaments η spec (8) | 0.70 | 0.74 | 0.67 | 0.83 | 0.84 | 0.83 | 0.73 | 0.82 |
| tensile strength (g/dtex) | 4.4 | 4.5 | 3.9 | 5.6 | 5.1 | 4.6 | 4.5 | 5.5 |
| elongation at break % (of drawn filaments) | 27.1 | 17.4 | 19.6 | 20.8 | 19.0 | 17.7 | 25.6 | 14.0 |
| residual tensile strength after 760 hrs xeno test (%) (9) | 90.0 | 89.0 | 92.0 | 87.5 | 90.5 | 93.0 | 80.0 | 91.0 |
| 500 hours sunlight under window glass (10) | 99.0 | 97.0 | 97.0 | | | | 93.0 | |
| 500 hours sunlight (weathering) (10) | 73.0 | 72.5 | 86.0 | | | | 73.5 | |
| residual elongation at break % after 750 hours xeno test (9) | 64.5 | 79.5 | 68.5 | 60.5 | 67.0 | 76.0 | 61.0 | 89.5 |
| 500 hours sunlight under window glass (10) | 69.5 | 81.5 | 69.0 | | | | 69.0 | |
| 500 hours sunlight (weathering) (10) | 57.0 | 71.5 | 57.5 | | | | 52.0 | |

(1) filament yarn according to Example 1

(2) " " " " " 2

(3) " " " " " 3

(4) " " " " " 4

(5) " " " " " 5

The comparative filament yarns were prepared in principle by the same method.

(6) wt % of added dicarboxylic acid, calculated on the amount of DMT used. In the filament yarn of the polyester according to Japanese specification 71/21,747 the per cent by weight relate to the added dimethyl ester.

(7) mole % of total acid component (8) specific viscosity measured in a solution of 1 g of polymer in 100 ml of a 3 : 2 mixture of phenol/tetrachloroethane at 25°C, (9) Xenotest: the filament yarns were exposed in a xeno tester of Messrs. Quarzlampen GmbH, Hanau, Federal Republic of Germany at 65 % of relative humidity and a temperature in the testing chamber of 30 to 35°C. The temperature of the samples (black panel temperature) was about 40°C. The samples were exposed to light in a day-night rhythm, so that the actual exposure to light was only 50 % of the test period, i.e. an exposure to light of 750 hours as indicated in the table corresponds to 1,500 hours of day-night exposure. After said period of time the tensile strength and elongation at break of the filament yarns were again measured, they are given in the table in per cent of the initial values prior to the exposure to light.

(10) The filament yarns were exposed to sunlight in the open air under window glass and without protection by window glass. The time of exposure are the hours of sunshine only. The values indicated in the table are the residual values in %, calculated on the initial values, after 500 hours exposure to sunlight. The values are average values of three parallel test series.

The following examples illustrate the invention.

EXAMAPLE 1:

In a vessel with stirrer, column and reflux condenser 1,000 grams (5.15 moles) of dimethyl terephthalate were subjected to an e ester interchange reaction under nitrogen at 180° to 230°C with 800 grams of ethylene glycol and 0.23 gram of manganese acetate. During the course of 4 hours 410 ml of methanol distilled off. Next, 5 grams (0.49 mole, calculated on the total acid component) of 4-hydroxy-5-methyl-isophthalic acid were added and the mixture was stirred for 30 minutes at 220°C. 0.3 Grams of antimony trioxide and 0.11 gram of phosphorous acid were then added, the temperature was raised to 250°C and excess ethylene glycol was distilled off for 30 minutes at atmospheric pressure, whereupon the pressure was decreased to 10 torrs within 1 hour.

The temperature was increased to 280°C and simultaneously the pressure was reduced to about 0.2-0.6 torr. After 100 minutes the polycondensation was terminatd. The solution viscosity of the polyester, measured in a solution of 1 g of polymer in a 3 : 2 parts by weight mixture of phenol/tetrachloroethane at 25°C was $\eta_{spec} = 0.74$.

The dried polyester was spun to a filament yarn at 295°C with the aid of an extruder by pressing the melt by means of a spinning pump through a spinneret having 24 orifices (orifice diameter 0.25 mm) under a pressure of 150 atmospheres gauge and winding up the issuing filaments at a rate of 1,000 m/min. The filaments ($\eta_{spec}$ 0.70) were then drawn at 90°C in a ratio of 1 : 3.65 over rolls and after twisting and fixing a filament yarn having the following properties was obtained: titer 56.3 dtex, tensile strength 4.4 g/dtex and elongation at break 27.1 percent.

EXAMPLE 2:

Under the conditions of Example 1, 1,000 grams of dimethyl terephthalate were subjected to an ester interchange reaction, 30 grams (2.94 mole percent of total acid component) of 4-hydroxy-5-methylisophthalic acid were added and the mixture stirred for 30 minutes at 220°C. Next, 0.4 gram of antimony trioxide, 0.16 gram of phosphorous acid and 0.4 gram of titanium dioxide (Kronos AD) were added in the form of a glycolic suspension and the process was continued as described in Example 1. The polyester obtained had a solution viscosity of $\eta_{spec} = 0.81$.

The dried polyester was spun as described in Example 1 ($\eta_{spec}$ of the spun filaments 0.67) and drawn. The filament yarn obtained had the following properties: titer 56.5 dtex, tenxile strength 3.9 g/dtex and elongation at break 19.6 percent.

EXAMPLE 3:

1,000 grams of dimethyl terephthalate were subjected to an ester interchange reaction as described in Example 1, 10 g. (0.86 mole percent of total acid component) of 4-hydroxy-5-isopropylisophthalic acid were added and the process was continued as specified in Example 2. The polyester obtained had a solution viscosity $\eta_{spec} = 0.93$. The dried polyester was spun at 300°C with the aid of an extruder by pressing the melt by a spinning pump through a spinneret having 24 orifices (orifice diameter 0.4 mm) under a pressure of 210 atmospheres gauge and the issuing filaments were wound up at a rate of 340 m/min (filament viscosity $\eta_{spec} = 0.84$). The filaments were then drawn over rolls at 90°C in a ratio of 1 : 6.0 and after twisting and setting, a filament yarn having the following textile properties was obtained: titer 164 dtex, tensile strength 5.1 g/dtex, elongation at break 19.0 percent.

EXAMPLE 4:

1,000 Grams of dimethyl terephthalate were subjected to an ester interchange reaction as described in Example 1, 10 g (0.81 mole percent of total acid component) of 4-hydroxy-5-tert.butylisophthalic acid were added and the process was continued as described in Example 2. The polyester obtained had a solution viscosity $\eta_{spec} = 0.89$. After drying it was spun and drawn as described in Example 1 (viscosity of spun filaments $\eta_{spec} = 0.73$). The filament yarn obtained had the following textile properties: titer 56.2 dtex, tensile strength 4.5 g/dtex, elongation at break 25.6 percent.

EXAMPLE 5:

1,000 Grams of dimethyl terephthalate were subjected to an ester interchange reaction under the conditions of Example 1, 10 grams (0.81 mole percent of total acid component) of 4-hydroxy-5-sec-butyl-isophthalic acid were added and the process was continued as described in Example 2. The polyester obtained, having a solution viscosity $\eta_{spec} = 0.97$, was dried and spun as described in Example 1 (viscosity of spun filaments $\eta_{spec} = 0.82$). After drawing the filament yarn had the following properties: titer 151 dtex, tensile strength 5.5 g/dtex and elongation at break 14 percent.

EXAMPLE 6:

Ester interchange was performed as in Example 1, 0.4 g of antimony trioxide, 0.16 gram of phosphorous acid and 0.4 g of titanium dioxide (Kronos AD) were added to the reaction mixture which was then polycondensed as specified in Example 1. After a condensation period of 150 minutes in full vacuum the reaction was interrupted by the introduction of nitrogen, 16 grams (0.887 moles percent of total acid component) of 4-hydroxy-5-methyl-isophthalic acid diphenyl ester were stirred into the condensation mixture within 3 minutes under nitrogen at atmospheric pressure. During a short period of time the pressure was again reduced to 0.2 torr and the melt was condensed for 25 minutes with separation of phenol to yield a highly viscous polyester. Prior to the addition of the diphenyl ester, the polyester viscosity $\eta_{spec}$ was 0.76, the final viscosity was 1.08.

The polyester was spun under the conditions specified in Example 3 (viscosity of spun filaments $\eta_{spec} = 0.82$) and drawn. The filament yarn obtained had a titer of 144 dtex, a tensile strength of 5.9 g/dtex and an elongation at break of 12.5 percent.

EXAMPLE 7:

1,000 grams of dimethyl terephthalate were subjected to an ester interchange reaction as described in Example 1, 80 grams of adipic acid and 10 grams (0.895 mole percent of total acid component) of 4-hydroxy-5-methyl-isophthalic acid were added and stirring was continued until the splitting off of water was terminated. Polycondensation was performed as specified in Example 1. The copolyester obtained had a viscosity $\eta_{spec}$ of 1.06 and a melting point of 243°C in the Kofler heater.

The dried copolyester was spun as described in Example 1 (viscosity of spun filaments $\eta_{spec} = 0.86$) and drawn. The filament yarn obtained had a titer of 69.7 dtex, a tensile strength of 3.1 g/dtex and an elongation at break of 25.5 %.

EXAMPLE 8:

1,000 Grams of dimethyl terephthalate, 1,000 grams of 1,4-butanediol and 44.5 mg of isopropyl titanate were subjected to an ester interchange reaction as described in Example 1 by heating for 135 minutes to 150°–190°C until the separation of methanol was terminated. 10 Grams (0.98 mole percent of total acid component) of 4-hydroxy-5-methyl-isophthalic acid were added and the mixture was stirred for another 30 minutes at 190°C. The pressure was reduced to about 100 torrs and during the course of 30 minutes the excess of butanediol was substantially distilled off. The temperature was then raised to 220°C and the pressure reduced to 0.1 – 0.5 torr during the course of 30 minutes. After having reached the final vacuum the polycondensation was effected at a temperature of 235°C. The modified polybutylene terephthalate had a solution viscosity $\eta_{spec} = 1.30$.

The dried polyester was spun at 260°C through a spinneret with 20 orifices (orifice diameter 0.25 mm) and the filaments were wound up at a rate of 1,300 m/min. The filament yarn drawn in usual manner in a ratio of 1 : 2.2 had the following textile properties: titer 54.2 dtex, tensile strength 3.9 g/dtex, elongation at break 28.8 percent.

What is claimed is:

1. Synthetic linear, fiber- and film-forming polyester the macromolecules of which are composed of dicarboxylic acid and diol moieties, wherein about 0.1 to 5 mole % of the dicarboxylic acid moieties are structural units of the formula

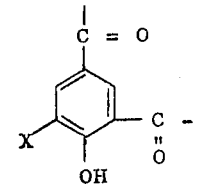

in which X stands for the group

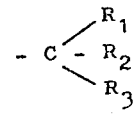

wherein $R_1$, $R_2$ and $R_3$ each are hydrogen or an alkyl of from 1 to 4 carbon atoms.

2. A synthetic polyester as claimed in claim 1 containing about 0.5 to 3 mole percent of structural units of the defined formula.

3. A synthetic polyester as claimed in claim 1, wherein in the structural units of the defined formula $R_1$ represents hydrogen and $R_2$ and $R_3$ each are alkyl of from 1 to 4 carbon atoms.

4. A synthetic polyester as claimed in claim 1, containing at least 90 percent of terephthalic acid units and at least 90 mole percent of ethylene glycol or butylene glycol units.

5. A synthetic linear polyester as claimed in claim 3, containing at least 90 mole percent of terephthalic acid units and at least 90 mole percent of ethylene glycol or butylene glycol units.

6. Filaments, made from the polyester claimed in claim 1.

7. Shaped articles made from the polyesters claimed in claim 1.

8. Fibers made from the polyester claimed in claim 1.

* * * * *